United States Patent
Rai et al.

(10) Patent No.: US 8,644,156 B2
(45) Date of Patent: Feb. 4, 2014

(54) LOAD-BALANCING TRAFFIC WITH VIRTUAL PORT CHANNELS

(75) Inventors: Smita Rai, Mountain View, CA (US); Chandan Mishra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 265 days.

(21) Appl. No.: 13/015,868

(22) Filed: Jan. 28, 2011

(65) Prior Publication Data

US 2012/0195195 A1    Aug. 2, 2012

(51) Int. Cl.
*H04J 1/16*    (2006.01)

(52) U.S. Cl.
USPC ........ 370/235; 370/360; 370/230.1; 370/397; 370/395.2; 370/400

(58) Field of Classification Search
None
See application file for complete search history.

(56) References Cited

U.S. PATENT DOCUMENTS

| | | | |
|---|---|---|---|
| 5,625,877 A * | 4/1997 | Dunn et al. | 455/454 |
| 6,628,670 B1 * | 9/2003 | Galand et al. | 370/468 |
| 6,647,008 B1 * | 11/2003 | Galand et al. | 370/389 |
| 2010/0189117 A1 * | 7/2010 | Gowda et al. | 370/401 |
| 2010/0290472 A1 | 11/2010 | Raman et al. | |
| 2010/0290473 A1 | 11/2010 | Enduri et al. | |
| 2011/0182294 A1 * | 7/2011 | Lee et al. | 370/394 |
| 2011/0274114 A1 * | 11/2011 | Dhar et al. | 370/401 |

* cited by examiner

*Primary Examiner* — Willie J Daniel, Jr.
(74) *Attorney, Agent, or Firm* — Edell, Shapiro & Finnan, LLC (57) ABSTRACT

Techniques are provided to load-balance traffic across a plurality of virtual PortChannel links (ports) at a switch device. The switch device interfaces to the plurality of virtual PortChannel links and receives packets to be routed of the plurality of links. The switch device routes the packets of the links so as to favor certain links over others based on operation conditions of the respective links.

14 Claims, 6 Drawing Sheets

| Link | Hash Value |
|---|---|
| Eth1/1 | 0 |
| Eth1/2 | 1 |
| Eth1/3 | 2 |
| Eth1/4 | 3 |
| Eth1/3 | 4 |
| Eth1/4 | 5 |
| Eth1/3 | 6 |
| Eth1/4 | 7 |

FIG. 7

| Link | Hash Value |
|---|---|
| Eth1/1 | 0 |
| Eth1/2 | 1 |
| Eth1/3 | 2 |
| Eth1/4 | 3 |
| Eth1/1 | 4 |
| Eth1/2 | 5 |
| Eth1/3 | 6 |
| Eth1/4 | 7 |

| Link | Hash Value |
|---|---|
| Eth1/3 | 0 |
| Eth1/4 | 1 |
| Eth1/3 | 2 |
| Eth1/4 | 3 |
| Eth1/3 | 4 |
| Eth1/4 | 5 |
| Eth1/3 | 6 |
| Eth1/4 | 7 |

LOAD-BALANCING TRAFFIC WITH VIRTUAL PORT CHANNELS

TECHNICAL FIELD

The present disclosure relates to routing traffic with virtual port channels.

BACKGROUND

With input/output consolidation achieved using technologies such as Fiber Channel over Ethernet (FCoE), Ethernet and Fiber Channel (FC) traffic can use the same links and port-channels between devices. A port channel is an enhancement to Layer 2 Ethernet networks (now standardized as IEEE 802.3ad PortChannel technology), in which multiple links between two participating devices can use all the links between the devices to forward traffic through the use of a load-balancing algorithm that balances traffic across the available Inter-Switch Links (ISLs) while also managing the loop problem by bundling the links as one logical link.

One limitation of the port channel technology is that it operates only between two devices. In large networks, the support of multiple devices together is often a design requirement to provide for an alternate path. This alternate path is often connected in a way that would cause a loop, limiting the benefits gained with PortChannel technology to a single path. To address this limitation, a technology called virtual PortChannel (vPC) was developed. When configured to implement virtual PortChannel technology, each switch in a pair acts as a vPC peer endpoint, that is, like a single logical entity to PortChannel-attached devices, but the two devices that act as the logical PortChannel endpoint are still two separate devices.

When two types of traffic, e.g., Ethernet traffic and FCoE traffic, are mixed over a virtual PortChannel, problems are created that can result in poor load-balancing of traffic over certain virtual PortChannel links.

DESCRIPTION OF EXAMPLE EMBODIMENTS

Overview

Techniques are provided to load-balance traffic across a plurality of virtual PortChannel links (ports) at a switch device. The switch device interfaces to the plurality of virtual PortChannel links and receives packets to be routed of the plurality of links. The switch device routes the packets of the links so as to favor certain links over others based on operation conditions of the respective links.

Example Embodiments

Figure 1:
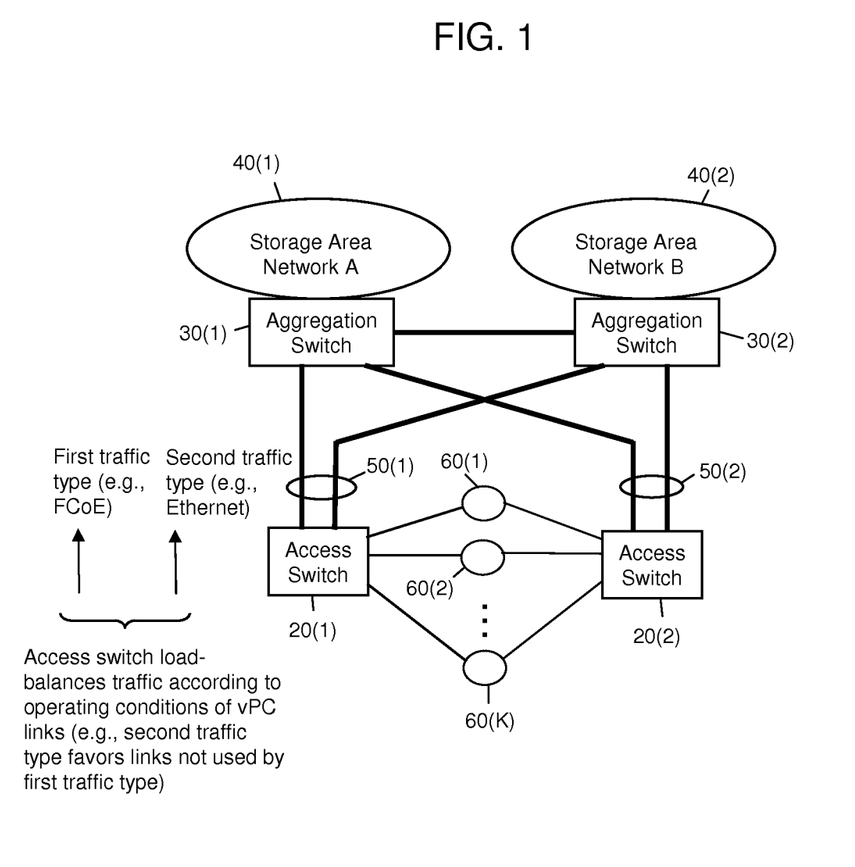
FIG. 1 is a block diagram showing an example of a networking environment in which an access switch is configured to load-balance traffic over virtual PortChannel links in a controlled manner.

Referring first to FIG. 1, an example of a network is shown at reference numeral 10 comprising first and second access switches 20(1) and 20(2) and first and second aggregation switches 30(1) and 30(2). The aggregation switches 30(1) and 30(2) are associated with respective storage area networks 40(1) and 40(2), denoted Storage Area Network (SAN) A and Storage Area Network B. Access switch 20(1) sends traffic to aggregation switch 30(1) and aggregation switch 30(2) over a virtual PortChannel (vPC) bundle 50(1). Similarly, access switch 20(2) sends traffic to aggregation switch 30(2) and aggregation switch 30(1) over vPC bundle 50(2). There are also intervening network devices 60(1)-60(K) between the access switches 20(1) and 20(2). These intervening network devices may comprise any combination of Layer 2 network devices or equipment.

In the example network shown in FIG. 1, there are first and second traffic types that are routed from an access switch to an aggregation switch. For example, the first traffic type is Fiber Channel over Ethernet (FCoE) traffic and the second traffic type is Ethernet traffic. Normally, FCoE traffic flows only to a particular storage area network through a certain node in the network, and there is a connection to a backup storage area network (through different nodes) for resiliency. For example, access switch 20(1) sends FCoE traffic to storage area network 40(1) via access switch 30(1) and storage area network 40(2) is a backup for storage area network 40(1). Traffic for the two storage area networks is not allowed to mix at any node. Therefore, even though FCoE traffic is going over a vPC bundle, it should not be randomly hashed on to a link to one chassis or destination, e.g., to aggregation switch 30(1) and to another chassis or destination, e.g., to aggregation switch 30(2). Consequently, the access switch 20(1) sends FCoE traffic exclusively on designated one or more links so that the FCoE traffic is sent to only to aggregation switch 30(1) for storage area network 40(1). In this sense, one or more links of vPC 50(1) are "bound" to FCoE traffic whereas other links of vPC 50(1) are not bound as such.

Thus, in one example, a significant percentage of a link to one of the chassis or destinations is utilized by FCoE traffic, while the link to the other chassis or destination is unused (unless failures occur). If Ethernet traffic is allocated across all the vPC links (going towards both the destinations), the available bandwidth for an Ethernet packet flow is limited by the minimum bandwidth available on a constituent vPC link. For example, if FCoE traffic uses 80% of a 10 Gbps link, the available bandwidth for an Ethernet traffic flow, assuming even load-balancing hashing, is only 2 Gbps.

Accordingly, the access switches 20(1) and 20(2) are configured to load-balance traffic according to operating conditions of the vPC links it uses to communicate with other devices. As described in more detail hereinafter, the operating conditions of the vPC links may be based on utilization of the respective links and traffic type, i.e., utilization of certain links exclusively for a certain type of traffic (e.g., FCoE traffic bound to certain vPC links) and/or other conditions such as whether an application specific integrated circuit (ASIC) associated with a particular link is overheating, for example, to achieve savings in power and costs associated with cooling the equipment. In one example, the load-balancing hashing for Ethernet traffic is performed using awareness of the presence of certain vPC links bound to FCoE traffic. The load-balancing hash table for Ethernet traffic is generated so as to favor vPC links not used by FCoE traffic. As a result, the "expected" bandwidth available for Ethernet traffic flows is increased.

Figure 2:
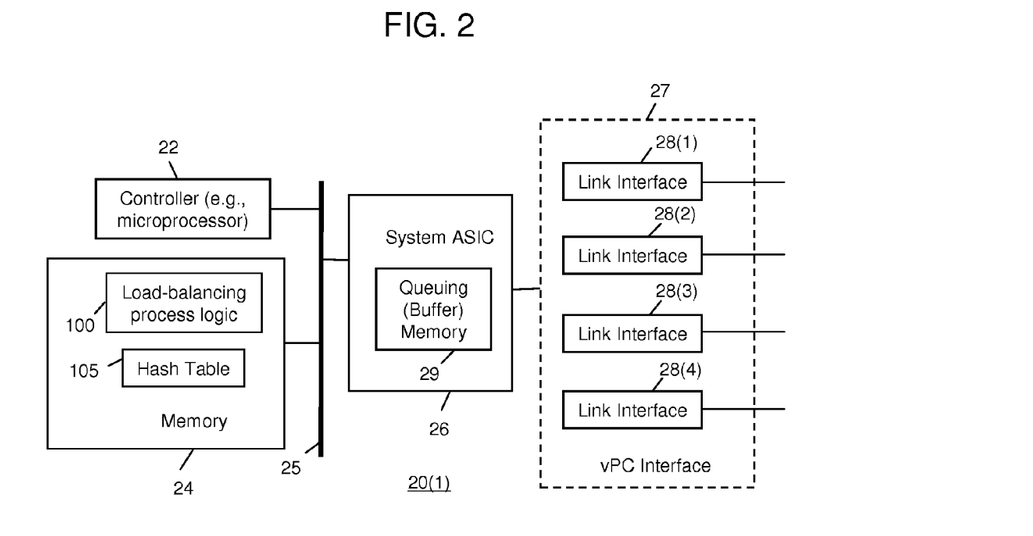
FIG. 2 is a block diagram of an example of an access switch device that is configured to load-balance traffic over virtual PortChannel links according to the techniques described herein.

Turning now to FIG. 2, an example of a block diagram of an access switch, e.g., access 20(1), is now described. Access switch 20(2) may have a similar configuration. Access switch 20(1) comprises a controller 22, memory 24, a system ASIC 26 and a vPC interface 27 comprising a plurality of link interfaces, e.g., four link interfaces 28(1)-28(4). A system bus 25 is provided to which the controller 22, memory 24 and system ASIC 26 are connected to facilitate the exchange of data and controls between the access switch components. The controller 22 is a microprocessor or microcontroller for example that is programmable to perform a variety of control operations for the access switch. To this end, the memory 24 stores or is encoded with instructions for load-balancing process logic 100. The controller 22 executes the instructions for the load-balancing process logic 100 to perform the load-balancing techniques described herein. In addition, the controller 22, in the course of executing the load-balancing process logic 100, assigns values in a load-balancing hash table 105 stored in memory 24. Examples of the load-balancing hash table 105 are described hereinafter in connection with FIGS. 6, 7 and 9.

The system ASIC 26 performs a variety of operations for the access switch associated with receiving packets at the access switch and forwarding/routing packets from the access switch under control of the load-balancing operations performed by the controller 22. One component of the system ASIC 26 is a queuing memory 29 that buffers or queues packets received at the access switch. Based on the assignment of hash values in the load-balancing table 105 to vPC links, the system ASIC 26 directs packets stored in the memory 29 to one of the link interfaces 28(1)-28(4) of the vPC interface 27. There are other functions performed by the system ASIC 26 that are not relevant to the load-balancing techniques described herein.

The memory 24 may comprise read only memory (ROM), random access memory (RAM), magnetic disk storage media devices, optical storage media devices, flash memory devices, electrical, optical, or other physical/tangible memory storage devices. Thus, in general, the memory 24 may comprise one or more computer readable storage media (e.g., a memory device) encoded with software comprising computer executable instructions and when the software is executed (by the controller 22) it is operable to perform the operations described herein in connection with process logic 100. The memory 24 may be a re-programmable memory device so that the load-balancing process logic 100 can be updated as needed.

In another form, the load-balancing operations described herein as being performed by the controller 22 may instead be performed by digital logic gates appropriately configured in the system ASIC 26 or other hardware control component. In still another form, some of the load-balancing operations are performed both by the controller 22 and system ASIC 26.

Figure 3:
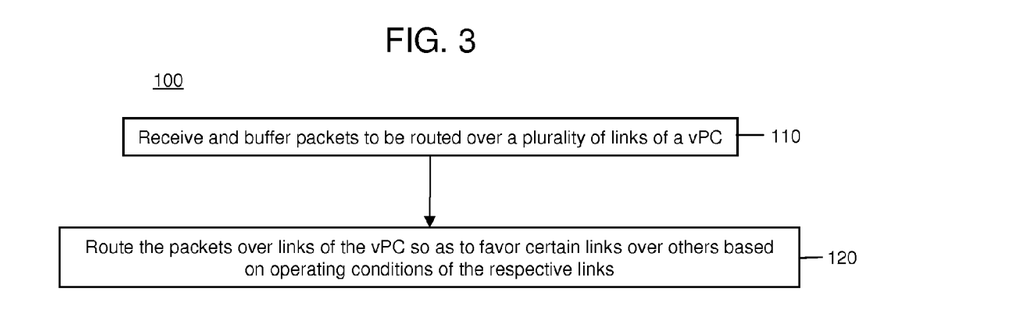
FIG. 3 is a high level flow chart depicting an example of the operations performed by the access switch device to load-balance traffic over a plurality of links of a virtual PortChannel.

Reference is now made to FIG. 3 for a description of a high level flow chart for the load-balancing process logic 100. Generally, the load-balancing process logic 100 operates upon receipt of packets at an access switch, which packets are to be forwarded to a destination via corresponding ones of a plurality of vPC links. Thus, at 110, packets received at the access switch are buffered prior to being routed over a plurality of links of a vPC. Individual vPC links are referred to as "links" but it should be understood that the term "port" is also commonly used to refer to an individual physical port of a vPC interface. Thus, the term "port" may be used interchangeably with the term "link" used herein. At 120, the access switch routes the packets over links of the vPC so as to favor certain links over other links based on operating conditions of the respective links. In other words, the packets are routed over the vPC links with a preference to one or more links over others based on operating conditions of the links. By "favor" or "preference" it is meant that packets are routed over certain links a greater percentage of time than over other links.

Figure 4:
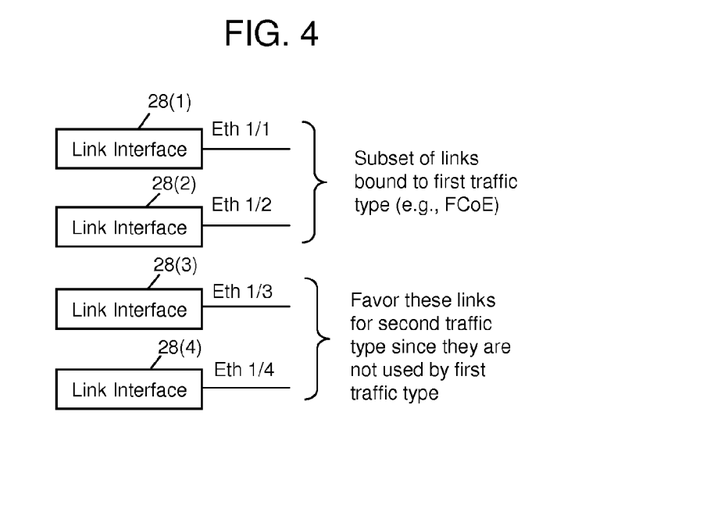
FIG. 4 is a diagram depicting one example of load-balancing two types of traffic over the plurality of virtual PortChannel links according to the techniques described herein.

Referring to FIG. 4, in one example, the operating conditions of the links consist of certain vPC links being exclusively bound or allocated to a certain type of traffic, e.g., FCoE traffic. For example, given a plurality of plurality of vPC links denoted Eth 1/1, Eth 1/2, Eth 1/3 and Eth 1/4 for one vPC interface, a subset of the plurality of links, such as links Eth 1/1 and Eth 1/2, are bound to a first traffic type, e.g., FCoE traffic. That is, the first traffic type is forwarded from the access switch exclusively over the links in that subset, e.g., links Eth 1/1 and Eth 1/2. The links in the subset may still be used for other types of traffic. Likewise, links Eth 1/3 and Eth 1/4 may be used for any type of traffic.

Figure 5:
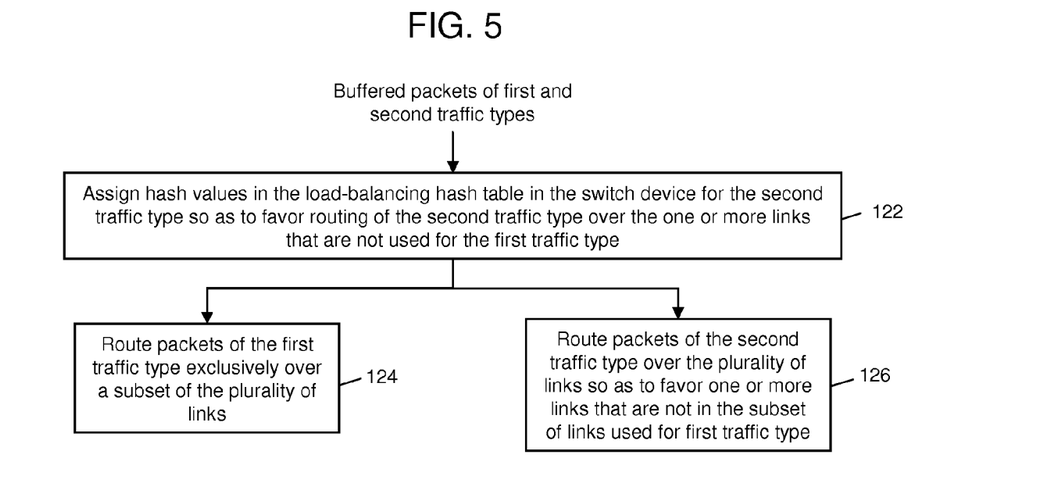
FIG. 5 is a flow chart depicting examples of operations performed by the access switch device in load-balancing traffic over the virtual PortChannel links for the scenario depicted in FIG. 4.

FIG. 5 illustrates a flow chart showing examples of routing operations (associated with operation 120 in FIG. 3) for the scenario shown in FIG. 4. At 122, hash values in the load-balancing hash table 105 are assigned for the second traffic type to links so as to favor routing of packets for the second traffic type over the one or more links that are not used for the first traffic type. At 124, packets of the first traffic type are routed exclusively over the subset of the plurality of links, e.g., Eth 1/1 and Eth 1/2, that are bound to the first traffic type. At 126, on the basis of the values in the load-balancing hash table 105 (assigned at 122), packets of a second traffic type, e.g., Ethernet traffic, are routed over the plurality of links so as to favor one or more links that are not in the subset of links used for the first traffic type. That is, a greater percentage of the packets of the second traffic type are sent over those links not used for the first traffic type than over the links used for the first traffic type.

Figure 6:
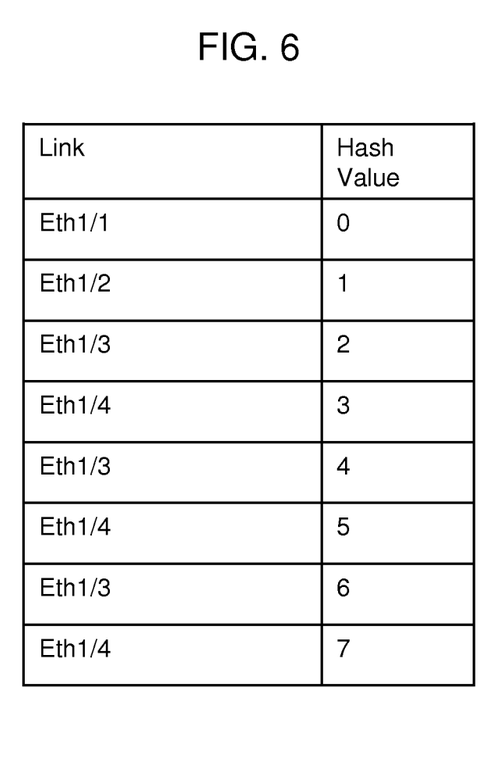
FIG. 6 illustrates a load-balancing table comprising values assigned to load-balance the second type of traffic for the example scenario of FIG. 4.

Referring now to FIG. 6, examples of values for the load-balancing hash table 105 are shown for the scenario of FIGS. 4 and 5. In this example, the load-balancing hash table 105 is an 8-way hash table. There are four links or ports for this vPC, denoted Eth 1/1-1/4 corresponding to those shown in FIG. 4. Links Eth 1/1 and 1/2 are bound to FCoE traffic so all of the FCoE traffic is routed over links Eth 1/1 and 1/2. The hash values in the right-hand column of the table shown in FIG. 6 are, for example, Random-Based Hash (RBH) values, but according to the techniques described herein, the assignment of these values to vPC links is modified to achieve the desired load balancing of traffic.

For the scenario of FIGS. 4 and 5, the hash values are modified for Ethernet traffic to reflect a preference to links not used by FCoE traffic. When FCoE traffic is bound to certain links in a vPC, the hash values for Ethernet traffic are modified depending on the percentage of bandwidth occupied by FCoE traffic. For example, if a customer or other entity associated with the traffic desires 75% of the bandwidth of the links Eth 1/1 and Eth 1/2 to be used for FCoE traffic, then the hash values for the Ethernet traffic are modified so that Ethernet traffic is routed over links Eth 1/1 and Eth 1/2 only 25% of the time. As a result, approximately 12% of Ethernet traffic is routed over each of Eth 1/1 and Eth 1/2 and the remaining 75% of the time, Ethernet traffic is distributed between Eth 1/3 and Eth 1/4. Thus, as shown in the table of FIG. 6, hash values 0-3 are assigned to Eth 1/1-1/4, respectively, but hash values 4-7 are assigned alternately to Eth 1/3 and Eth 1/4 so that overall Ethernet traffic will favor links Eth 1/3 and 1/4 which do not carry any FCoE traffic. For example, hash value 4 is assigned to Eth 1/3, hash value 5 is assigned to Eth 1/4, hash value 6 is assigned to Eth 1/3 and hash value 7 is assigned to Eth 1/4. As a result, a greater percentage of the Ethernet traffic is sent over the links or ports of the vPC interface that do not carry FCoE traffic than over the links or ports of the vPC interface that carry FCoE traffic. The assignment of the hash values for Ethernet traffic to links or ports is dependent on the percentage of bandwidth for FCoE traffic to be sent on those links bound to FCoE traffic and the remaining number of links that are not bound to FCoE traffic. Said another way, the routing operations that result from the example described in connection with FIGS. 4-6 involve routing packets of a first traffic type exclusively over one or more links and routing packets of a second traffic type over one or more links not used by the first traffic type a greater percentage of time than over links used by the first traffic type. Again, the hash values in the load-balancing hash table for the second traffic type are assigned to links based on a percentage of bandwidth of the subset of the plurality of links to be used for the first traffic type. In general, if the percentage of bandwidth of the links bound to the first traffic type is denoted "X", then hash values in the load-balancing table for packets of the second traffic type are assigned to links such that packets of the second traffic type are routed to the links used for the first traffic type 100-X percent of the time, and a remaining percentage of time packets of the second traffic type are distributed between the links not used for the first traffic type. This load-balancing technique increases the expected bandwidth for the Ethernet traffic, while routing FCoE traffic on links allocated for FCoE traffic up to the desired percentage.

Figure 7:
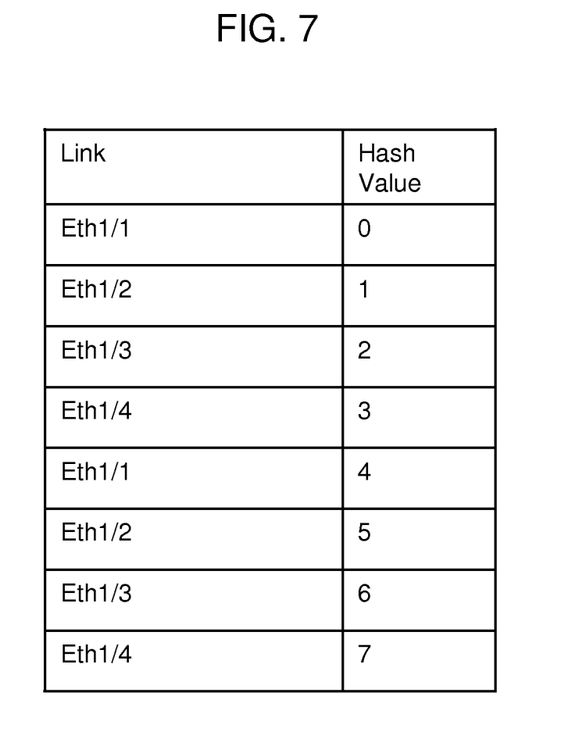
FIG. 7 illustrates the load-balancing table comprising values that return to conventional load-balancing when a first type of traffic terminates.

FIG. 7 illustrates examples of the assignment of hash values for Ethernet traffic when there is a vFC failure such that the vFC interface cannot support routing of FCoE traffic, but links Eth 1/1 and 1/2 are still operational for Ethernet traffic. Since links Eth 1/1 and 1/2 are no longer used for FCoE traffic, Ethernet traffic can fully utilize all of the links. Thus, hash values 0-3 in the load-balancing table are the same as for the table in FIG. 6, but hash values 4-7 in this table are assigned to distribute Ethernet traffic across Eth 1/1-1/4 as well. Thus, the assignment of hash values for Ethernet traffic becomes one of an equal distribution across all of the links.

Figure 8:
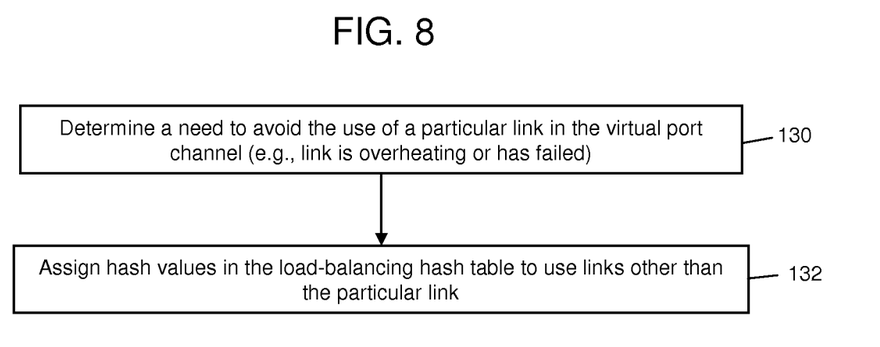
FIG. 8 is a flow chart depicting further examples of operations performed by the access switch device for load-balancing traffic across the plurality of virtual PortChannel links based on operating conditions of one or more of the links.
Figure 9:
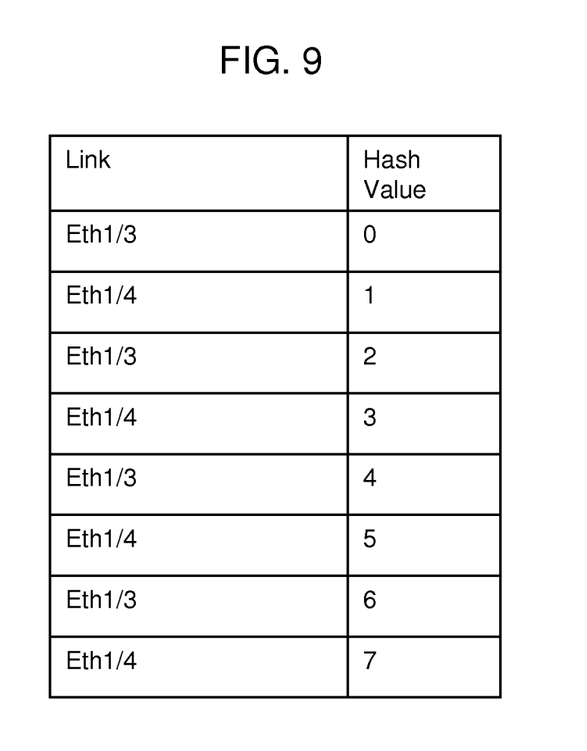
FIG. 9 illustrates a load-balancing table comprising values for an example scenario using the operations depicted in the flow chart of FIG. 8.

Turning now to FIGS. 8 and 9, another scenario is now described. In this scenario, one or more vPC links are to be avoided for use in routing traffic. For example, a link should be avoided if the supporting hardware, e.g., ASICs, for that link is overheating. In another example, a link may have failed and is no longer operational to carry traffic of any type. The flow chart of FIG. 7 illustrates additional operations of the load-balancing process logic 100 to handle scenarios of this type. At 130, the access switch determines a need to avoid a particular link (or multiple links) in the vPC, e.g., due to overheating or failure. The controller in the access switch may receive a stream of operating conditions information associated with each link, including temperature or other performance information indicating that the supporting hardware associated with a particular link is overheating or a total failure has occurred. The need to avoid a link may be temporary or permanent. For example, in the configuration shown in FIG. 4, links Eth 1/1 and 1/2 are determined to have failed and can no longer be used for any type of traffic. Thus, only links Eth 1/3 and 1/4 are available. Thus, at 132, hash values in the load-balancing table are assigned so as to route packets to links other than the particular link or links. In the example where the failed links Eth 1/1 and 1/2 are the links to be used for FCoE traffic, then the access switch would route the FCoE traffic over the path to the aggregation switch associated with the backup storage area network as described above in connection with FIG. 1. For example, access switch 20(1) would forward FCoE traffic to aggregation switch 30(2) associated with storage area network 40(1).

FIG. 9 illustrates a load-balancing hash table for the scenario described above in connection with FIG. 8. Again, links Eth 1/1 and 1/2 are to be avoided due to failure or other reasons. The hash values in the load-balancing table for the Ethernet traffic are assigned to links Eth 1/3 and 1/4 in an alternating manner so that the Ethernet traffic is essentially equally distributed between those two links. The techniques described herein in connection with FIGS. 8 and 9 are applicable to a single type of traffic, e.g., Ethernet traffic.

All of the techniques described herein may be performed to achieve real-time adjustment of vPC link assignments according to operating conditions and/or any desired load distribution.

As described herein, the techniques described herein provide for efficient input/output consolidation of traffic by manipulating the load-balancing hash for the links of a virtual PortChannel to reflect link utilization between various types of traffic. In one example, the PortChannel hashing is modified when FCoE and Ethernet traffic are carried over a vPC to reflect the fact that FCoE traffic is not expected to be sent across all the vPC links and the links unused by FCoE should be preferred more by Ethernet traffic. This a substantial improvement over equal hashing in which case many Ethernet flows will hash to links carrying FC traffic and experience much lower bandwidth availability.

Thus, in one form, the techniques described herein are embodied by a method comprising, at a switch device that interfaces to a plurality of links of a virtual port channel, receiving packets to be routed over the plurality of links; and routing the packets over links of the virtual port channel so as to favor certain links over others based on operating conditions of the respective links.

In another form, an apparatus is provided comprising a plurality of link interfaces configured to interface to corresponding ones of a plurality of links of a virtual port channel; a memory configured to buffer packets that are to be routed over the plurality of links; and a controller configured to assign values in a load-balancing table to route packets to the links so as to prefer certain links over other links based on operating conditions of the respective links.

In yet another form, provided herein is one or more computer readable storage media encoded with software comprising computer executable instructions and when the software is executed operable to: receive and buffer packets to be routed over a plurality of links of a virtual port channel; and assign values in a load-balancing table to route packets to the links so as to prefer certain links over other links based on operating conditions of the respective links.

The above description is intended by way of example only.

What is claimed is:

1. A method comprising:
at a switch device that interfaces to a plurality of links of a virtual port channel, receiving packets to be routed over the plurality of links; and
generating hash values for each of the plurality of links, wherein the hash values represent traffic usage of the links;
evaluating the hash values to classify each of the links as either a high priority link or a low priority link, wherein a link is classified as a high priority link when the link is unused for traffic and wherein the link is classified as a low priority link when the link is used for traffic; and
routing the packets over the links of the virtual port channel so as to favor certain links over other links based on operating conditions of the respective links, wherein the packets are routed to the high priority links and the low priority links based on the hash values assigned to the plurality of links such that packets are routed on links classified as high priority links more often than on links classified as low priority links, wherein receiving comprises receiving packets of a first traffic type and packets of a second traffic type, and routing comprises routing packets of the first traffic type and packets of the second traffic type over links of the virtual port channel based on utilization of the respective links and traffic type; and wherein routing comprises routing packets of the first traffic type exclusively over a subset of the plurality of links and routing packets of the second traffic type over the plurality of links so as to favor one or more links that are not in the subset of links used for the first traffic type.

2. The method of claim 1, wherein routing comprises routing packets of the first traffic type exclusively one or more of the plurality of links and routing packets of the second traffic type over one or more links not used by the first traffic type a greater percentage of time than over links used by the first traffic type.

3. The method of claim 1, wherein the first traffic type is Fiber Channel over Ethernet traffic and the second traffic type is Ethernet traffic.

4. The method of claim 1, wherein routing comprises assigning values in a load-balancing table in the switch device for the second traffic type to links so as to favor routing of the second traffic type over the one or more links that are not used for the first traffic type.

5. The method of claim 4, wherein assigning comprises assigning values in the load-balancing table for packets of the second traffic type based on a percentage of bandwidth of the subset of the plurality of links to be used for the first traffic type.

6. The method of claim 4, wherein assigning comprises assigning values in the load-balancing table for packets of the second traffic type to links such that a greater percentage of packets of the second traffic type are sent over the links not used for the first traffic type than over the links used for the first traffic type.

7. The method of claim 1, and further comprising determining a need to avoid use of a particular link in the virtual port channel, and wherein routing comprises routing packets to links of the virtual port channel to use links other than the particular link.

8. An apparatus comprising:
a plurality of link interfaces configured to interface to corresponding ones of a plurality of links of a virtual port channel;
a memory configured to buffer packets that are to be routed over the plurality of links; and
a controller configured to:
generate hash values for each of the plurality of links, wherein the hash values represent traffic usage of the links;
evaluate the hash values to classify each of the links as either a high priority link or a low priority link, wherein a link is classified as a high priority link when the link is unused for traffic and wherein the link is classified as a low priority link when the link is used for traffic; and
route the packets over the links so as to favor certain links over other links based on operating conditions of the respective links, wherein the packets are routed to the high priority links and the low priority links based on the hash values assigned to the plurality of links such that packets are routed on links classified as high priority links more often than on links classified as low priority links, wherein the memory buffers packets of a first traffic type and packets of a second traffic type to be routed, and the controller is configured to assign values in the load-balancing table so as to route packets of the first traffic type and packets of the second traffic type over links of the virtual port channel based on utilization of the respective links and traffic type; and wherein the memory buffers packets of a first traffic type and packets of a second traffic type to be routed and the packets of the first traffic type are to be routed exclusively over a subset of the plurality of links, and wherein the controller is configured to assign values in the load-balancing table to route packets of the second traffic type so as to favor one or more links that are not used for the first traffic type.

9. The apparatus of claim 8, wherein the controller is configured to assign values in the load-balancing table for the second traffic type to links such that a greater percentage of packets of the second traffic type are sent over the links not used for the first traffic type than over the links used for the first traffic type.

10. The apparatus of claim 9, wherein the controller is configured to assign values in the load-balancing table for packets of the second traffic type based on a percentage of bandwidth of the subset of the plurality of links to be used for the first traffic type.

11. One or more non-transitory computer readable storage media encoded with software comprising computer executable instructions and when the software is executed operable to:
receive and buffer packets to be routed over a plurality of links of a virtual port channel; and
generate hash values for each of the plurality of links, wherein the hash values represent traffic usage of the links;
evaluate the hash values to classify each of the links as either a high priority link or a low priority link, wherein a link is classified as a high priority link when the link is unused for traffic and wherein the link is classified as a low priority link when the link is used for traffic; and
route packets over the links so as to favor certain links over other links based on operating conditions of the respective links, wherein the packets are routed to the high priority links and the low priority links based on the hash values assigned to the plurality of links such that packets are routed on links classified as high priority links more often than on links classified as low priority links, wherein the instructions are operable to receive and buffer packets of a first traffic type and packets of a second traffic type to be routed, and the instructions that are operable to assign comprise instructions that are operable to assign values in the load-balancing table so as to route packets of the first traffic type and packets of the second traffic type over links of the virtual port channel based on utilization of the respective links and traffic type; and wherein the instructions are operable to receive and buffer packets of a first traffic type and packets of a second traffic type to be routed and the packets of the first traffic type are to be routed exclusively over a subset of the plurality of links, and wherein the instructions that are operable to assign generate the hash values comprise instructions that are operable to assign hash values in the load-balancing table to route packets of the second traffic type so as to favor one or more links that are not used for the first traffic type.

12. The computer readable storage media of claim 11, wherein the instructions that are operable to generate the hash values comprise instructions that are operable to assign values in the load-balancing table for the second traffic type to links such that a greater percentage of packets of the second traffic type are sent over the links not used for the first traffic type than over the links used for the first traffic type.

13. The computer readable storage media of claim 11, wherein the instructions that are operable to generate hash values comprise instructions that are operable to assign values in the load-balancing table for packets of the second traffic type based on a percentage of bandwidth of the subset of the plurality of links to be used for the first traffic type.

14. The computer readable storage media of claim 11, and further comprising instructions that are operable to determine a need to avoid use of particular link in the virtual port channel, and the instructions that are operable to assign values comprise instructions that are operable to assign values in the load-balancing table to route packets over links other than the particular link of the virtual port channel.

\* \* \* \* \*